UNITED STATES PATENT OFFICE.

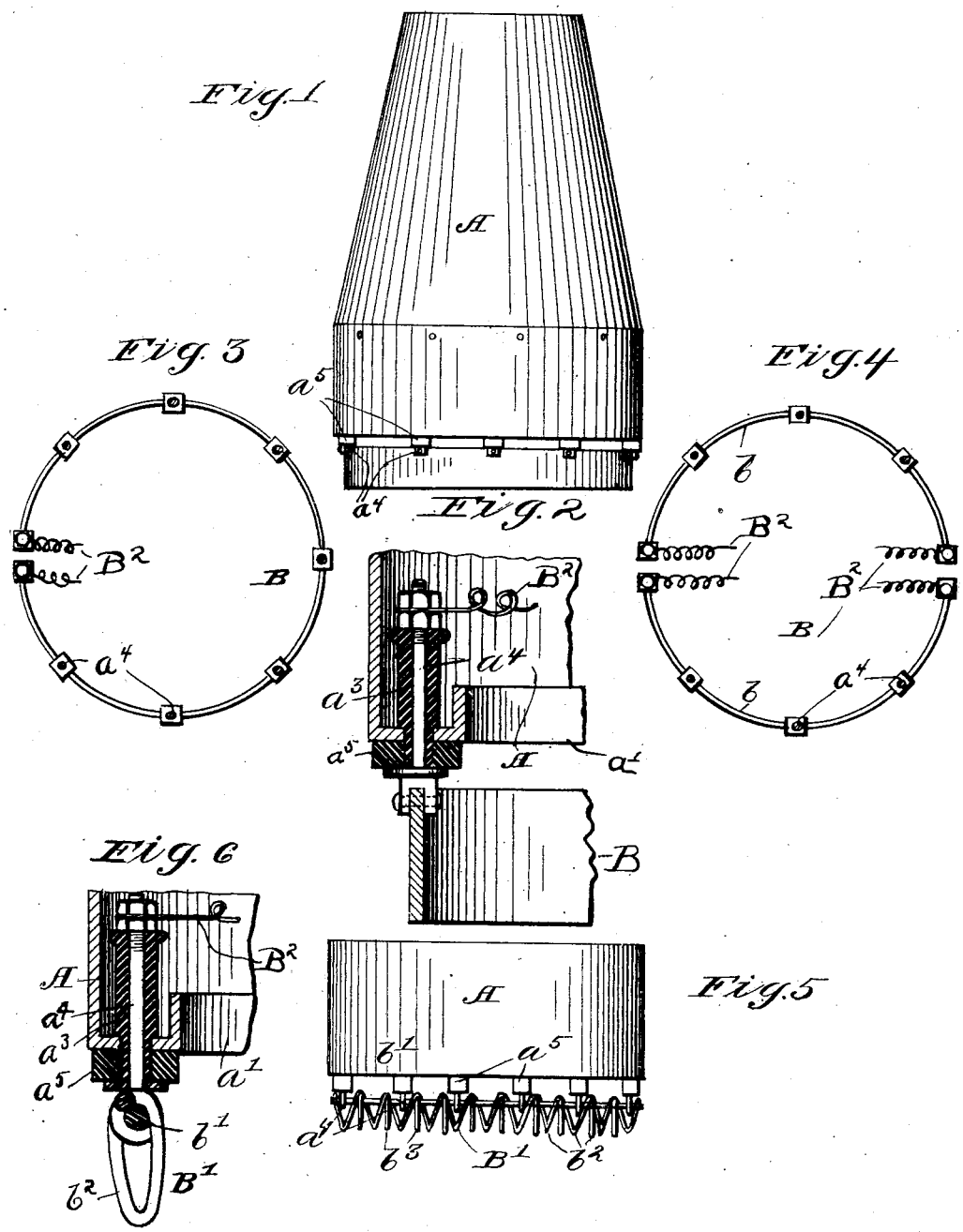
R. L. FRINK.
BAIT FOR DRAWING GLASS.
APPLICATION FILED MAY 20, 1909.
972,615.
Patented Oct. 11, 1910.
Inventor:
Robert L. Frink

ROBERT L. FRINK, OF LANCASTER, OHIO.

BAIT FOR DRAWING GLASS.

972,615.  Specification of Letters Patent.  Patented Oct. 11, 1910.

Application filed May 20, 1909. Serial No. 497,274.

*To all whom it may concern:*

Be it known that I, ROBERT L. FRINK, a citizen of the United States, and a resident of Lancaster, county of Fairfield, and State of Ohio, have invented a new and useful Improvement in Baits for Drawing Glass, of which the following is a specification, the principle of the invention being herein explained and the best mode in which I have contemplated applying that principle, so as to distinguish it from other inventions.

An essential element in all glass drawing apparatus is the bait or member whereby the cylinder or sheet, as the case may be, is drawn upwardly from the bath of molten glass. In the various forms of bait currently in use in glass drawing operations, more or less difficulty is experienced in preventing the cylinder or sheet as it cools, from breaking away from the bait, owing to the unequal rates of contraction of the material of the cylinder, namely glass, and that of the bait which is usually made of metal or some refractory material.

The object of the present invention is the provision of a bait wherein twofold means are provided for avoiding this difficulty. In other words, the construction of the bait is made such, mechanically, as to permit its rate of contraction and expansion to conform to that of the cylinder attached thereto; while, at the same time, means are provided for preventing too sudden a fall in the temperature of the bait and attached glass cylinder, such means involving an improvement in the electrically heated glass bait that forms the subject matter of my Patent No. 915,282, dated March 16, 1909.

To the accomplishment of the foregoing ends, said invention, then, consists of the means hereinafter fully described and particularly pointed out in the claims.

The annexed drawing and the following description set forth in detail certain mechanism embodying the invention, such disclosed means constituting, however, but several of the various mechanical forms in which the principle of the invention may be used.

In said annexed drawing:—Figure 1 is a side elevational view of a glass bait embodying the several improvements constituting my present invention; Fig. 2 is a transverse sectional view of said bait; Fig. 3 is a plan view of the portion of said bait constituting the bait member proper; Fig. 4 is a similar plan view of a modified construction of such bait member; Fig. 5 is a side elevational view corresponding to that of Fig. 1 but illustrating a still further modification in the construction of the bait; and Fig. 6 is a detail view on a larger scale of such modified construction.

The several illustrated forms of my improved glass bait all relate to mechanism for drawing the glass in cylindrical form, as is the general practice in the manufacture of sheet or window glass; it is not meant by this, however, to imply that the invention is limited to use in drawing cylinders only, for it is adapted equally well for the drawing of glass in sheets or other forms. No part of the drawing mechanism other than the bait is illustrated, but in the two forms of the bait illustrated respectively in Figs. 1 and 5, I have shown the same respectively adapted for use in connection with glass drawing apparatus such as is commonly employed at present, and for employment in apparatus of the kind described in U. S. Letters Patent No. 846,102 issued to me March 5, 1907. The only differences in construction between the two forms, so far as such differences are involved in the adaptation of the bait for use with one or the other of such types of drawing mechanism, relate to the form of the body or supporting member A of the bait, this being shown as of general cylindrical form, open freely at the top in Fig. 5, whereas in Fig. 1 a more pronounced conical form is given such body, and the upper end $a$ is arranged to be connected with a suitable source of fluid pressure supply. Turning, then, to those features of construction of present interest, it will be noted (see Figs. 1 and 2) that such body portion A of the bait is preferably constructed of pieces of sheet metal of the proper form, riveted or otherwise securely fastened together. The lower edge of such body portion is then flanged, the flange $a'$ being preferably turned on the inner side of the body, so that in effect an L-shaped annular ring is provided. From this ring a series of spaced lugs depend downwardly, said lugs consisting specifically of insulating tubes or sleeves $a^3$ composed of lava, porcelain or other refractory material through which pass bolts $a^4$. To the lower ends of the latter is secured the bait member B proper. Bushings $a^5$ composed of similar material to that of sleeves $a^3$ serve to keep such bait member proper out of direct contact with the body portion of the bait and thus reduce to a minimum the conduction of heat away from the member. In other words, by this arrangement of connecting means, taken in conjunction with the relatively small heat conducting capacity of such means even in the aggregate, the bait member is substantially heat-insulated from the rest of the apparatus. At the same time, owing to the character of the material of which they are composed, said bushings also serve to electrically insulate said bait member from such body portion. As illustrated in Figs. 2, 3 and 4, said bait member is in the form of an attenuated metal band or ribbon that is secured onto the bolts that pass through the insulating bushings $a^5$ and the tubes $a^3$, the heads of said bolts being slotted to receive said ribbon as shown in Fig. 2. By employing a sufficient number of bolts and spacing them a proper distance apart, the ribbon is maintained in substantially circular form, as will be obvious, so as to correspond with the cross sectional form of the cylinder to be drawn. Said ribbon, furthermore, is discontinuous, being composed, preferably, of two or more sections $b$ (Fig. 4) as a result of which construction, taken in connection with the flexible character, of the ribbon, it will be clear that the portions of the bait member intermediate between bolts $a^4$ are free to move relatively to each other, and to the support A. Inasmuch as such member is thus free to contract and expand, it will accommodate itself readily to the contraction of the cylinder as the latter cools, without producing the strains that normally occur where a rigid bait member is employed. Such strains, as has been indicated, are frequently of a sufficient degree of severity to cause a rupture in the cylinder cap and a consequent separation of the cylinder from the bait so that the former crashes down with consequent loss of material, not to speak of the interruption in operation of the plant.

In the modified form of construction illustrated in Figs. 5 and 6, I have substituted for the discontinuous metal ribbon B, of the form of bait just described, a wire B' that is suspended from a rod $b'$ bent in a circular form and supported from the bait body through the medium of insulated bolts $a^4$, or the like, in the same fashion as before. The wire B' is wound in a semi-rectangular or a V-section, so that a series of loops of more or less angular form depend somewhat as fringes $b^2$ all about the lower edge of the bait body. The function of these in forming means for the attachment of the glass to the bait will be obvious, as will also be the fact that they are free to move relatively to each other and to such bait body just as in the case of the sections $b$ of the ribbon above described.

In either of the two preceding forms of my improved bait, I contemplate, furthermore, the utilization of the principle of the electrical heating of the same to maintain the temperature at approximately that of the glass fully set forth in the patent previously referred to. The parts thus heated in the present case will be the metal ribbon or wire suspended from the bait body, and suitably insulated therefrom by the interposed bushings $a^5$ and sleeves $a^3$. With this end in view, suitable flexible connections $B^2$ whereby a heating current may be caused to pass through such bait member, whatever its construction, are of course, provided. Inasmuch as the entire member, through which the current is passed, here comes into direct contact with the glass, the difficulty encountered, where the electrical heating means are disposed within the bait member, of securing uniform heating of the contacting surface is avoided. The ultimate current consumption, moreover, is not nearly as great in this bait as in the other, and it is not necessary to preliminarily heat the bait before placing the same in the bath of molten glass from which the cylinder is to be drawn. The wire form of construction is obviously adapted for use with higher voltages than the ribbon and selection of one or the other will be based in part on this consideration. In connection with the wire form of construction, moreover, I find it advantageous to introduce between the convolutions or loops $b^2$ of the wire B', other elements preferably in the form of hooks $b^3$ that depend freely from the rod $b'$, and are adapted to come in contact with the glass along with said wire. These depending members, although not heated directly by the current, will be heated sufficiently by conduction through the glass that envelops them, by reason of their small cross section and limited conducting power, so that no dangerous strain will be set up in such glass. At the same time, an advantage is secured in that such hooks will remain as a rigid supporting medium in the cap of the cylinder, since they cannot be raised to such a temperature that the weight of the cylinder will distort them. In this respect, they will accordingly, supplement the loops of the wire through which the heating current is passed, while in no wise detracting from the feature of adjustability that characterizes the general bait structure. By reason of this adjustability, it is contemplated that it will only be necessary to make use of the heating electric current when cylinders of extreme length are being drawn, as for example, cylinders of from 30 to 40 feet in length, it being unnecessary to heat the wire at all for lengths less than this. The amount of glass gathered by the bait, moreover, is considerably less than in the case of a cap blown and drawn by means of a bait of the prevailing construction, where there is frequently a considerable mass of glass attached directly below the bait. The danger of the cap cracking and the cylinder breaking from the bait is thus further minimized, as will be obvious.

The temperature at which I contemplate maintaining the bait during the draw is above the second point of tenson in the glass, that is above the point where the glass comes to a set, glass men generally speaking of glass having two points of tension, the first point being 1200 to 1400 degrees F. where vitrification takes place, and the second being in the neighborhood of 900 F. The volume of the current that is passed through the bait is accordingly regulated, having due regard to the electrical resistance of the latter so as to maintain the temperature of said bait at a temperature above such second point of tension and thus enable the glass immediately contacting with the bait to accommodate itself without rupture to any relative displacement of said member such as may occur as a result of changes in their temperature.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A bait for drawing glass comprising a suitable support, a bait member flexibly borne by said support, said member being adapted to come in direct contact with the glass, and connections for passing a heating electric current through said member.

2. A bait for drawing glass comprising a suitable support, a metallic member flexibly borne by said support, said member being electrically insulated from said support, and a connection for passing a heating electric current through the bait member.

3. A bait for drawing glass, comprising a suitable support, a metallic band secured at separated points along one edge to said support, and connections for passing a heating electric current through said band.

4. A bait for drawing glass, comprising a suitable support, an attenuated metallic band secured at separated points along one edge to said support, whereby the intermediate portions of said band are left free to move relatively to each other and to said support, and connections for passing a heating electric current through said band.

5. A bait for drawing glass cylinders, comprising a suitable support, a discontinuous metallic band of general circular form secured at separated points along one edge to said support, and connections for passing a heating electric current through said band.

6. A bait for drawing glass cylinders, comprising a suitable support, a discontinuous metallic band secured at separated points along one edge to said support, said band consisting of a plurality of sections disposed in a general circular form, and connections for passing a heating electric current through the sections of said band.

7. A bait for drawing glass, comprising a suitable support, and a metallic band secured at separated points along one edge to said support, whereby said band may contract and expand relatively to said support.

8. A bait for drawing glass cylinders, comprising a suitable support, a discontinuous metallic band of general circular form secured at separated points along one edge to said support, whereby said band may contract and expand relatively to said support.

9. A bait for drawing glass cylinders, comprising a suitable support, a discontinuous metallic band secured, edge on, thereto, said band consisting of a plurality of sections disposed in a general circular form and so secured to said support as to be movable relatively to each other and the latter.

10. In a bait for drawing glass cylinders, the combination with a support of general cylindrical form, of a contractible and expansible bait member, proper, secured to the lower edge of said support, the points of attachment of said bait member to said support being spaced apart and the intermediate portions of said member being free to move relatively to each other and said support.

11. In a bait for drawing glass cylinders, the combination with a support of general cylindrical form, of an attenuated metallic band secured, edge on, to the lower edge of said support, the points of attachment of said band to said support being spaced apart and the intermediate portions of said band being free to move relatively to each other and said support.

12. A bait for drawing glass from a bath of molten glass, comprising a support, a bait member, and means connecting the bait member and support and also serving to space the bait from the support in order to secure heat insulation of the bait and permit its flexure.

13. A bait for drawing glass, comprising a support, a metallic band forming the bait member proper, means of less heat conducting capacity than the bait member proper, securing the bait member to the support, and heat insulating means between said securing means and support.

14. A bait for drawing glass comprising a support, a flexible metallic band forming the bait member, and means of less heat conducting capacity than the bait member, carried by the support and carrying the bait member.

15. A bait for drawing glass, comprising a support, a bait member proper, means of less heat conducting capacity than the bait member, carried by said support and carrying the bait member, electrical insulating means between the bait member and its support and connections for passing a heating electric current through the bait member.

16. A bait for drawing glass comprising a support, a metal band forming the bait member proper, means of less heat conducting capacity than the bait member, carried by said support and carrying the bait member, electrical insulating means between the bait member and its support and connections for passing a heating electric current through the bait member.

17. A device for drawing glass comprising a suitable support, a bait and means for supporting said bait from said support, said means also serving to space the bait from the support to secure heat insulation and permit the flexure of the bait.

18. A bait for drawing glass comprising a support, and a metal band separated from said support and secured at intervals thereto the said securing means being of less heat conducting capacity than the bait member.

19. A bait for drawing glass comprising a support and a flexible metallic band separated from said support and secured at intervals thereto, the said securing means being of less heat conducting capacity than the bait member.

20. A bait for drawing glass, comprising a support, a bait, means for supporting said bait from said support said means being electrically insulated from the support and serving to space the bait from the support, to secure heat insulation of the bait, and connections for passing a heating electric current through said bait.

21. In a bait for drawing glass, the combination of a support; a plurality of separated lugs along the lower edge of said support; and a metallic band secured to said lugs and forming the bait member proper.

22. In a bait for drawing glass cylinders, the combination of a support having its lower edge of general circular form; a plurality of separated lugs along such lower edge; and a metallic band secured to said lugs and forming the bait member proper, said lugs having a relatively small heat conducting capacity whereby said band is substantially heat-insulated from said support.

23. In a bait for drawing glass cylinders, the combination of a support having its lower edge of general circular form; a plurality of separated lugs along such lower edge but electrically insulated therefrom; and a metallic band secured to said lugs and forming the bait member proper, said lugs having a relatively small heat conducting capacity whereby said band is also substantially heat-insulated from said support.

24. In a bait for drawing glass cylinders, the combination of a support having its lower edge of general circular form; a plurality of separated lugs along such lower edge; and a metallic band secured to said lugs and forming the bait member proper, said band being sufficiently attenuated to be contractible and expansible relatively to said support and said lugs having a relatively small heat conducting capacity whereby said band is substantially heat-insulated from said support.

25. In a bait for drawing glass cylinders, the combination of a support having its lower edge of general circular form; a plurality of separated lugs along such lower edge; and a metallic band secured to said lugs and forming the bait member proper, said band being discontinuous and sufficiently attenuated to be contractible and expansible relatively to said support and said lugs having a relatively small heat conducting capacity whereby said band is substantially heat-insulated from said support.

26. In a bait for drawing glass, the combination of a support; a plurality of separated lugs secured along the lower edge of, but electrically insulated from, said support; a metallic band secured to said lugs and forming the bait member proper, said lugs having a relatively small heat conducting capacity whereby said band is substantially heat-insulated from said support; and connections for passing a heating electric current through said band.

27. In a bait for drawing glass cylinders, the combination of a support having its lower edge of general circular form; a plurality of separated lugs secured along such lower edge but electrically insulated from said support; a metallic band secured to said lugs and forming the bait member proper, said band being sufficiently attenuated to be contractible and expansible relatively to said support, and said lugs having a relatively small heat conducting capacity whereby said band is substantially heat-insulated from said support; and connections for passing a heating electric current through said band.

28. In a bait for drawing glass cylinders, the combination of a support having its lower edge of general circular form; a plurality of separated lugs secured along such lower edge but electrically insulated from said support; a metallic band secured to said lugs and forming the bait member proper, said band being dis-continuous and sufficiently attenuated to be contractible and expansible relatively to said support, and said lugs having a relatively small heat conducting capacity whereby said band is substantially heat-insulated from said support; and connections for passing a heating electric current through the sections of said band.

29. A bait for drawing glass comprising a support, a flexible bait member borne by, but spaced from said support, and means for passing a heating electric current through said flexible member.

Signed by me this 12th day of May, 1909.

ROBERT L. FRINK.

Attested by—
H. K. BECK,
H. B. PETERS.